United States Patent [19]
Jensen

[11] Patent Number: 5,888,032
[45] Date of Patent: *Mar. 30, 1999

[54] PADDLE FITTING TOOL

[75] Inventor: Sam C. Jensen, Glendora, Calif.

[73] Assignee: Cooper Technologies Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 713,752

[22] Filed: Sep. 13, 1996

[51] Int. Cl.⁶ .............................. B23B 35/00; B23B 45/14
[52] U.S. Cl. .............................. 408/1 R; 408/80; 408/95; 408/103
[58] Field of Search .............................. 408/1 R, 79, 80, 408/95, 97, 103

[56] References Cited

U.S. PATENT DOCUMENTS

| | | |
|---|---|---|
| 1,749,769 | 3/1930 | Johnson . |
| 1,780,812 | 11/1930 | Burnelli . |
| 2,598,106 | 5/1952 | Boyle ........................................ 408/95 |
| 2,884,819 | 5/1959 | Roubloff ................................... 408/95 |
| 2,942,814 | 6/1960 | Schuerch et al. ........................ 244/131 |
| 3,048,109 | 8/1962 | Feemster .................................. 102/50 |
| 3,109,614 | 11/1963 | Steidl ....................................... 244/87 |
| 3,209,623 | 10/1965 | Schardt ..................................... 77/64 |
| 3,411,593 | 11/1968 | Quackenbush .......................... 173/145 |
| 3,429,206 | 2/1969 | Quackenbush .......................... 77/34.7 |
| 3,436,038 | 4/1969 | Parsons et al. .......................... 244/123 |
| 3,574,290 | 4/1971 | Eckman .................................... 408/9 |
| 3,797,583 | 3/1974 | Quackenbush ............................ 173/4 |
| 4,228,976 | 10/1980 | Eiselbracher et al. .................. 244/123 |
| 4,390,153 | 6/1983 | Wuermseer .............................. 244/131 |
| 4,591,299 | 5/1986 | Eckman ..................................... 408/1 |
| 4,592,681 | 6/1986 | Pennison et al. ......................... 408/10 |
| 4,679,969 | 7/1987 | Riley ....................................... 408/103 |
| 4,865,493 | 9/1989 | Miller ...................................... 408/1 R |
| 5,054,968 | 10/1991 | Eckman .................................... 408/97 |
| 5,065,959 | 11/1991 | Bhatia et al. ............................. 244/54 |
| 5,496,002 | 3/1996 | Schütze ................................... 244/123 |

FOREIGN PATENT DOCUMENTS

| | | |
|---|---|---|
| 2546431 | 5/1984 | France . |
| 2659583 | 9/1991 | France .................................. 408/103 |
| 4014210 | 11/1991 | Germany .............................. 408/103 |
| 15607 | 1/1983 | Japan ...................................... 408/95 |
| 323195 | 2/1972 | Russian Federation ................. 408/80 |
| 1282977 | 1/1987 | Russian Federation ................. 408/95 |
| 1664473 | 7/1994 | Russian Federation ............... 408/103 |
| 307668 | 3/1929 | United Kingdom . |

OTHER PUBLICATIONS

International Search Report, dated Dec. 30, 1997, for International Appication No. PCT/US97/15087.
Pp. 5, 45 and 46 from Quackenbush Precission Drilling Equipment catalog, © 1992.
Drawing ST7220C–1 describing a Quackenbush 15QDR–RAB–SU–RS drill. FR1 Dec. 12, 1994.
Pp. N2–4 from Cleco Air Tools catalog © 1993 Indresco Inc.

*Primary Examiner*—Daniel W. Howell
*Attorney, Agent, or Firm*—Burns, Doane, Swecker & Mathis, L.L.P.

[57] ABSTRACT

A paddle fitting tool for drilling a hole through a wing spar inserted into a paddle fitting where the paddle fitting has a top fork with a hole and a bottom fork also having a hole approximately aligned with the hole in the top fork. The paddle fitting tool couples a drill to a nut runner using a saddle. The nut runner is operable to clamp the paddle fitting to securably hold the paddle fitting and wing spar stationary during drilling. The drill is operable to hold a drill bit and to drill a hole in the wing spar. The saddle couples the nut runner to the drill such that the hole drilled through the wing spar is approximately concentric with the hole in the top fork and the hole in the bottom fork of the paddle fitting.

19 Claims, 2 Drawing Sheets

PADDLE FITTING TOOL

TECHNICAL FIELD OF THE INVENTION

The present invention relates generally to aircraft manufacturing systems and methods, more particularly, to a paddle fitting tool for coupling a wing spar to a paddle fitting attached to the fuselage of an aircraft.

BACKGROUND OF THE INVENTION

The wings of an aircraft are subject to numerous forces during takeoff, flight, and landing. Aircraft use wing spars to evenly distribute those forces. Each wing will have multiple wing spars radiating out from the fuselage (on both the bottom and top side of the wing) toward the tip of the wing. The wing spars carry these forces to ensure that each part of the wing surface carries a proportionate share of the load.

Each wing spar has two fuselage ends (one on the top of the wing and one on the bottom of the wing) that can insert into paddle fittings attached to the fuselage. A paddle fitting has a fork-shaped receptacle end for receiving the end of a wing spar. One method of holding the wing spar stationary within the paddle fitting involves drilling a hole through both forks of the paddle fitting and the wing spar, inserting a fastener through the hole, and tightening the paddle fitting/wing spar assembly to a specified torque.

Due to the exact tolerances required in building aircraft, the drilled hole must be both the appropriate diameter and concentric through both forks of the paddle fitting and the wing spar. A hole that is drilled too large or is non-concentric will degrade too rapidly under the operational forces of an aircraft. A manually operated drill cannot drill a hole through this material stack up that will meet these exact tolerance requirements on a consistent basis. These precise tolerances necessitate a device, such as a paddle fitting tool, that clamps to the paddle fitting/wing spar assembly to hold the drill stationary as the drill bit drills the hole through the paddle fitting and the wing spar.

To ensure the drilled hole has the appropriate dimensions and concentricity, conventional paddle fitting tools use a guide or fixture coupled to the drill. One example of such a conventional paddle fitting tool is manufactured by Boeing under drawing number ST7220C-1 that describes a Quackenbush 15QDR-RAB-SU-RS drill attached to a fixture having an air pressure cylinder to clamp the paddle fitting tool to the paddle fitting in order to hold the paddle fitting, and consequently the wing spar inserted within the forks of the paddle fitting, stationary.

However, these conventional paddle fitting tools have several limitations, including safety, cost of manufacture, and speed of operation. The air pressure cylinders typically clamp relatively rapidly and can therefore injure an operator. Another potentially dangerous situation can arise if the paddle fitting tool disengages from the paddle fitting while the drill is still operating. This can occur if the air pressure cylinder malfunctions (for example, due to air line deterioration or the air pressure being cut off). This can also occur because the air pressure cylinders typically cannot achieve a clamp force of six hundred pounds per square inch (psi) or greater.

Conventional paddle fitting tools can also be relatively slow because of the difficulty in locating and clamping the tool at the correct position on the paddle fitting.

SUMMARY OF THE INVENTION

The present invention provides a paddle fitting tool for use in attaching a wing spar to a paddle fitting connected to the fuselage of an aircraft that substantially eliminates or reduces disadvantages and problems associated with previously developed paddle fitting tools.

More specifically, the present invention provides a paddle fitting tool for drilling a hole through a wing spar inserted into a paddle fitting, where the paddle fitting has a top fork with a hole and a bottom fork also having a hole approximately aligned with the hole in the top fork. The paddle fitting tool couples a drill to a nut runner using a saddle. The nut runner is operable to clamp the paddle fitting to securably hold the paddle fitting and wing spar stationary during drilling. The drill is operable to hold a drill bit and to drill a hole in the wing spar. The saddle couples the nut runner to the drill such that the hole drilled through the wing spar is approximately concentric with the hole in the top fork and the hole in the bottom fork of the paddle fitting.

The present invention provides an important technical advantage by enhancing the safety of operation when attaching a wing spar to a paddle fitting. The use of a nut runner type-tool in the present invention eliminates the need for an air cylinder clamp that can injure the operator due to the rapid speed of engagement. The present invention allows a variable speed engagement of the paddle fitting tool to the paddle fitting. The present invention can also provide an increased clamping force, as compared to air cylinder paddle fitting tools, to reduce the likelihood that the tool will disengage from the paddle fitting during drilling operation.

The present invention provides another technical advantage by decreasing overall cost. The present invention can use commercially available nut runners and drills in combination to decrease the purchase cost. Furthermore, the present invention can increase the speed of performing the drilling operation by providing a retractable locator that sets the tool in its initial position for drilling.

Another technical advantage of the present invention includes the ability to use the present invention for both drilling the hole and subsequently reaming the drilled hole. The present invention can provide both functions by simply changing bits on the drill.

Yet another technical advantage of the present invention is the ability to vary the clamp force applied to the paddle fitting by adjusting the clutch in the nut runner. This feature allows the present invention to apply varying clamp forces on different sized paddle fittings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGURES, where like numerals are used to refer to like and corresponding parts of the various drawings.

A wing spar can couple to a receiving paddle fitting of the aircraft fuselage by means of a bolt and nut fastener passed through the top fork of the paddle, the wing spar and the bottom fork of the paddle fitting. In order to meet aircraft design requirements, the bolt engages both the wing spar and the forks of the paddle fitting via an interference fit. Thus, the hole drilled through the forks of the paddle fitting and the wing spar must be formed within precise tolerances. The present invention provides a paddle fitting tool that will tightly engage the paddle fitting in order to drill a concentric, like-diameter hole through the first fork of the paddle tool, the wing spar, and the second fork of the paddle tool.

Figure 1:
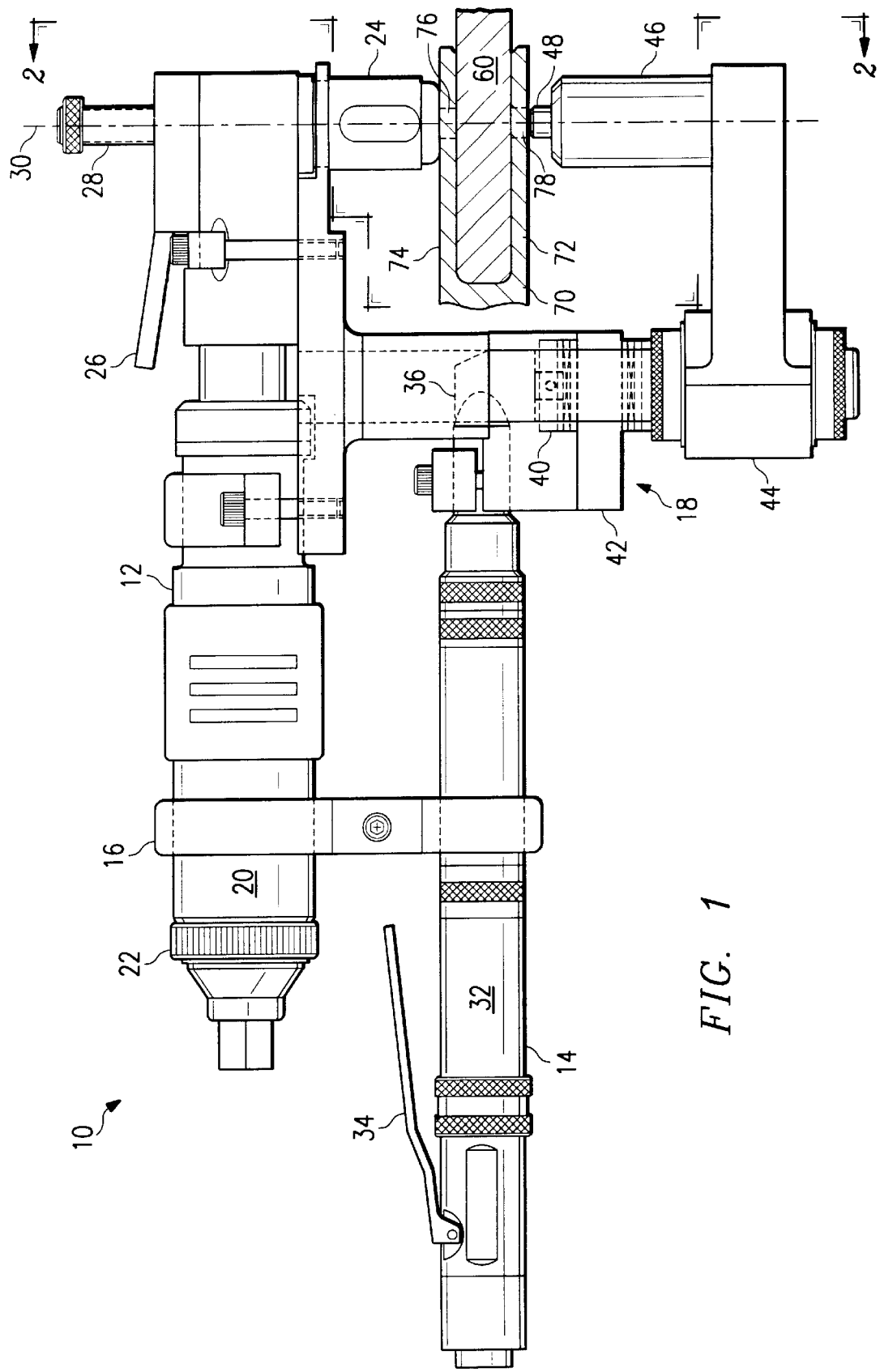
FIG. 1 is a drawing in elevation showing a side view of one embodiment of the present invention in an unclamped position and a partial view of a wing spar and a paddle fitting.

FIG. 1 illustrates one embodiment of the paddle fitting tool 10 of the present invention surrounding a wing spar 60 inserted into a paddle fitting 70 between bottom fork 72 and top fork 74. Wing spar 60 typically comprises an aluminum material ranging in thickness from approximately ⅜ on an inch to approximately one inch. Paddle fitting tool 10 includes drill 12 and nut runner 14 coupled together by saddle 18 and handle clamp 16. The optional handle clamp 16 shown in FIG. 1 can provide stability to the paddle fitting tool 10 during operation.

As shown in FIG. 1, drill 12 comprises a handle 20, a ring throttle 22 at the distal end of handle 20, and a nose 24, feed engagement lever 26, and a spindle 28 at the proximate end of handle 20. Spindle 28 can be designed to accommodate drill bits and reamers. Spindle 28 and nose 24 align at approximately a right angle to the handle 20. As shown in FIG. 1, nose 24 includes a passageway through which spindle 28 can slide during drilling. In operation, spindle 28, with an appropriate bit attached, will feed down through the passageway in nose 24 (at a right angle to the latitudinal axis of handle 20) along side centerline 30. Nut runner 14 of FIG. 1 comprises a body 32 with control lever 34 coupled at the distal end of body 32 and right angle gear head 36 at the proximate end of body 32 that nests within saddle 18. The gear head 36 shown in FIG. 1 has a square drive for engaging lead screw 40 of saddle 18.

Saddle 18 comprises lead screw 40 that runs into lower plate 42 and further into clamp plate 44. Clamp plate 44 also couples to alignment clamp 46 that includes locator pin 48. Saddle 18 couples drill 12 to nut runner 14 in a manner that aligns the centerline of the drill nose 24 with the centerline of locator pin 48 along side centerline 30. As shown in FIG. 1, side centerline 30 represents the centerline running vertically through the center of nose 24 and locator pin 48 as seen from a side view of paddle fitting tool 10.

Figure 2:
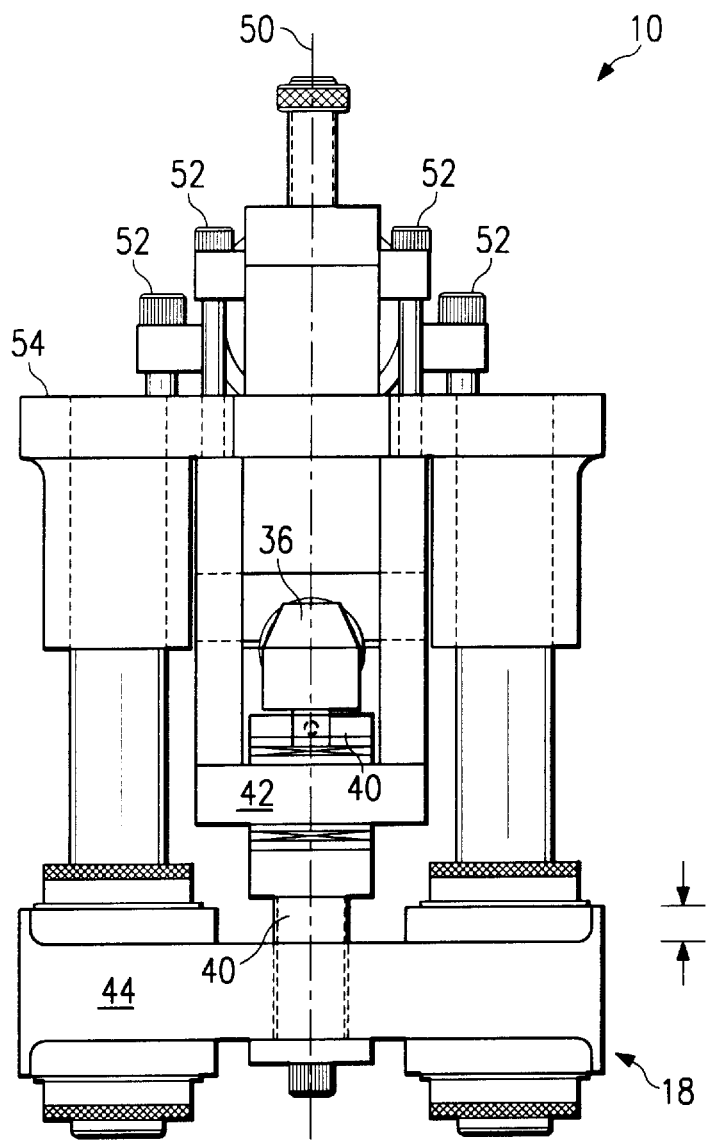
FIG. 2 is a drawing in section taken along the line 2—2 of the embodiment of FIG. 1.

FIG. 2 shows a front view of the paddle fitting tool 10 embodiment of FIG. 1 along section line 2—2 that further illustrates the features of saddle 18. As shown in FIG. 2, gear head 36 engages lead screw 40 that will run through lower plate 42 and into clamp plate 44. Clamp plate 44 contains a threaded cavity in which the lead screw travels during operation of nut runner 14. A plurality of fasteners 52 couple drill 12 to saddle 18 through holes placed in upper plate 54 of saddle 18. The holes for receiving the fasteners 52 are formed in saddle 18 such that when the drill 12 couples to saddle 18, and thereby to nut runner 14, the centerline of the drill nose 24 and the centerline of locator pin 48 align along front centerline 50 (and along side centerline 30 as shown in FIG. 1. Front centerline 50, as shown in FIG. 2, represents the line running vertically through the center of nose 24 and locator pin 48 as seen from the front view of paddle fitting tool 10.

It should be understood that the present invention can incorporate a variety of drills and nut runners. Both the nut runner and the drill must be appropriately sized such that the paddle fitting tool can fit into airframe assembly areas where the wing spars connect to the paddle fittings for the particular aircraft being built. The drill should also have an appropriate drill diameter capacity, while the nut runner should be able to produce sufficient torque to translate into sufficient clamping force on the paddle fitting tool. The nut runner should be capable of producing a maximum torque such that the clamping force on the paddle fitting tool can reach at least six hundred pounds. Nut runner 14 can be an angled nut runner used in combination with a right angle drill 12 to allow for proper alignment of the drill when drilling through wing spar 60.

In the specific embodiment shown in FIG. 1, drill 12 comprises a Quackenbush 15QDA-RAB-SU-RS series drill (Quackenbush 15), and nut runner 14 comprises a Cleco 5RNAL-174 series angled nut runner (Cleco 174). The Cleco 174 provides a nut runner that can provide a torque up to 100 inch pounds (in. lbs.) that can produce at least six hundred pounds of clamping force on the paddle fitting tool 10 during operation over a 0.50 inch clamp stroke. The Cleco 174 also provides the ability to vary the clamp force applied to the paddle fitting by adjusting the clutch in the nut runner. This feature allows the present invention to apply varying clamp forces on different sized paddle fittings. The Quackenbush 15 provides a drill with a nose radius of $^{21}/_{32}$ of an inch for fitting into tight airframe areas. The Quackenbush 15 also has a maximum engagement stroke of 1.5 inches and a diameter capacity in aluminum of $^{9}/_{16}$ of an inch. An embodiment of the paddle fitting tool 10 of the present invention that comprises a Quackenbush 15 drill and a Cleco 174 nut runner can perform the wing spar drilling operation on aluminum spar for a Boeing 747 aircraft.

With reference to FIG. 1, the operation of the present invention will be described. In preparation for using the paddle fitting tool 10 of the present invention, the top fork 74 and bottom fork 72 of paddle fitting 70 have hole 76 formed within the top fork 74 and hole 78 formed within bottom fork 72. Bottom fork hole 78 and top fork hole 76 can align approximately concentrically. These holes 76 and 78 are preferably formed to have an approximately equal diameter. The diameter of hole 78 in bottom fork 72 should be approximately the same diameter as the diameter of locator pin 48. Furthermore, the diameter of holes 76 and 78 should be approximately equal to the diameter of the drill bit that will be used to drill the hole in wing spar 60. Wing spar 60 is inserted within paddle fitting 70 between top fork 74 and bottom fork 72.

As shown in FIG. 1, paddle fitting tool 10 is positioned such that the nose 24 and alignment clamp 46 surround paddle fitting 70 on opposing sides of paddle fitting 70. Locator pin 48 can slide into bottom fork hole 78 to engage the paddle fitting tool 10 with the paddle fitting 70. In an alternative embodiment, locator pin 48 can comprise a retractable locator pin that is spring loaded. The retractable locator pin will retract into a cavity within alignment clamp 46 upon loading the spring and will release to an unloaded state into the hole 78. In yet another alternative embodiment, locator pin 48 can have screw threads to engage in a threaded bottom fork hole 78 of bottom fork 72. In this alternative embodiment, locator pin 48 would screw into threaded bottom fork hole 78 until securably engaged.

After locator pin 48 is engaged within bottom fork hole 78 of the paddle fitting 70, the operator presses the nut runner control lever 34 that causes the gear head 36 to rotate. The rotation of gear head 36 translates into rotation of lead screw 40. Because lead screw 40 is engaged by threads in clamp plate 44, lead screw 40 will descend into clamp plate 44 as lead screw 40 rotates. This rotation of lead screw 40 causes the nose 24 to contact the top fork 74 of the paddle fitting 70 and the alignment clamp 46 to contact the bottom fork 72. This provides a clamping force on the paddle fitting 70 and the wing spar 60 between the nose 24 and the alignment clamp 46. The nut runner 14 will continue to rotate gear head 36 (and thus, lead screw 40) to increase the clamping force on the paddle fitting 70 until the pre-set torque value on the nut runner 14 has been reached, upon which the nut runner will automatically shut off. The paddle fitting tool 10 can apply varying degrees of clamping force to the paddle fitting 70 by varying the torque setting on the nut runner 14. In one embodiment, the paddle fitting tool 10 can apply approximately 600 pounds of clamping force to the paddle fitting 70.

The clamping procedure described securely fastens the drill 12 to the paddle fitting 70. Because of the positioning of the drill 12 in relation to the nut runner 14 (due to the saddle 18), a drill bit (not shown) will align with the pin locator 48 along both the x-axis centerline (i.e., side centerline 30) and the z-axis centerline (i.e., front centerline 50). The drill bit (attached to the spindle 28) should be sized appropriately to form a wing spar hole that will have an interference fit with a bolt sent through the paddle fitting forks and the wing spar. The operator then opens ring throttle 22 to begin rotation of the spindle 28. The operator then pushes down the drill feed engagement lever 26 to begin drilling the hole through the wing spar 60. The operator controls the speed the spindle 28 moves downward with feed engagement lever 26. The drill 12 will then drill a hole through the wing spar 60 that is approximately concentric with top fork hole 76 and bottom fork hole 78 in the paddle fitting 70. The drill 12 can also drill out top fork hole 76 and bottom fork hole 78 if these two holes have been supplied as undersized holes (having a diameter smaller than the diameter of the hole through wing spar 60). The clamping force applied to the paddle fitting 70 will ensure the paddle fitting 70 and the wing spar 60 do not move during the drilling process. Thus, the hole through the wing spar 60 will have an approximately uniform diameter and will be approximately concentric with top fork hole 76 in the paddle fitting 70. After drilling, the hole through wing spar 60 can also have approximately the same diameter as bottom fork hole 78 and top fork hole 76 if bottom fork hole 78 and top fork hole 76 were supplied in paddle fitting 70 undersized.

The drill 12 of paddle fitting tool 10 can have a mechanism that will automatically re-track the drill bit once the spindle 28 reaches a predetermined position. After the drill 12 disengaged the drill bit from the paddle fitting 70, the drill 12 can be shut off. The nut runner operator can set the nut runner 14 to operate in the reverse direction to unclamp the paddle fitting tool 10 from the paddle fitting 70. Typical aircraft construction will require an operator drill one hole per paddle fitting and wing spar set.

A bolt can then be inserted through top fork hole 76, through the hole in the wing spar, and can exit bottom fork hole 78. The paddle fitting 70 can be secured to the wing spar 60 by tightening a nut around the bolt to a predetermined torque value. By using a drill bit that has a diameter slightly smaller than the bolt, the bolt will engage within the wing spar with an interference fit. The alignment of the drill 12 and the nut runner 14 with the saddle 18 ensures that the hole drilled in the wing spar 60 will meet the precise tolerance required by the aircraft assembly design. Thus, the force against the bolt due to the interference fit with the wing spar 60 will be exerted approximately over the entire length of the bolt contained within the wing spar 60. This will ensure less deterioration of the connection between the paddle fitting and the wing spar during operation, resulting in a longer operational life.

The present invention reduces or eliminates the dangers associated with air cylinder clamp style paddle fitting tools by combining a nut runner 14 with a drill 12 using a saddle 18. The variable speed nut runner 14 gives the operator control over the speed at which the clamping operation occurs. The nut runner 14 can also provide a sufficient clamping force to reduce the likelihood that the present invention will slip off the paddle fitting during drilling. The nut runner also eliminates the danger of an air cylinder malfunction that could lead to the drilling tool disengaging during drilling the wing spar.

In summary, the present invention provides a paddle fitting tool for drilling a hole through a wing spar inserted into a paddle fitting having a top fork with a hole and a bottom fork also having a hole approximately aligned with the hole in the top fork. The paddle fitting tool couples a drill to a nut runner using a saddle. The nut runner is operable to clamp the paddle fitting to securably hold the paddle fitting and wing spar stationary during drilling. The drill is operable to hold a drill bit and to drill a hole in the wing spar. The saddle couples the nut runner to the drill such that the hole drilled through the wing spar is approximately concentric with the hole in the top fork and the hole in the bottom fork of the paddle fitting.

Although the present invention has been described in detail, it should be understood that various changes, substitutions and alterations can be made hereto without departing from the spirit and scope of the invention as described by the appended claims.

What is claimed is:

1. A paddle fitting tool for drilling a hole through a wing spar inserted into a paddle fitting, the paddle fitting comprising a top fork having a top fork hole formed within the top fork and a bottom fork having a bottom fork hole formed within the bottom fork, the paddle fitting tool comprising:

a drill operable to receive a drill bit for drilling a hole in the wing spar;

a nut runner; and a saddle having a clamp, the saddle including means for connecting the nut runner to the clamp, the saddle operable to couple the drill to the nut runner such that the operation of the nut runner will cause the clamp to produce a predetermined clamping force on the paddle fitting to securably hold the paddle fitting and the wing spar when drilling the wing spar hole, and the saddle further operable to couple the nut runner to the drill such that the drill is positioned to drill a hole through the wing spar that is approximately concentric with the bottom fork hole and is approximately concentric with the top fork hole.

2. The paddle fitting tool of claim 1, wherein the saddle is operable to couple the drill to the nut runner such that the drill bit aligns vertically with a side centerline running vertically through both the top fork hole and the bottom fork hole and vertically with a front centerline running vertically through both the top fork hole and the bottom fork hole.

3. The paddle fitting tool of claim 1, further comprising a drill bit coupled to the drill, the drill bit operable to form a hole in the wing spar during operation of the drill, the drill bit having a diameter approximately equal to a diameter of the top fork hole.

4. The paddle fitting tool of claim 1, further comprising a drill bit coupled to the drill and operable to form a hole in the wing spar.

5. The paddle fitting tool of claim 1, wherein the drill comprises:
   a handle having a distal end and a proximate end;
   a nose coupled to the proximate end of the handle, the nose having a through passage; and
   a spindle coupled to the handle at the proximate end, the spindle operable to receive a drill bit, to rotate, and to feed through the nose through passage, the spindle vertically aligned with the nose at approximately a right angle to the latitudinal axis of the handle.

6. The paddle fitting tool of claim 5, wherein the means for connecting the nut runner to the clamp includes a rotatable gear head coupled to a lead screw for causing the clamping plate to produce the clamping force.

7. The paddle fitting tool of claim 6, wherein the saddle couples the nut runner to the drill such that the nose aligns vertically with a locator pin along a side centerline and along a front centerline.

8. A paddle fitting tool for drilling a hole through a wing spar inserted into a paddle fitting, the paddle fitting further comprising a top fork having a top fork hole formed within the top fork and a bottom fork having a bottom fork hole formed within the bottom fork, the paddle fitting tool comprising:
   a drill operable to receive a drill bit for drilling a hole in the wing spar, the drill comprising:
      a handle having a distal end and a proximate end;
      a nose coupled to the proximate end of the handle, the nose having a through passage;
      a spindle coupled to the handle at the proximate end, the spindle operable to rotate and to feed through the nose through passage toward the wing spar, the spindle vertically aligned with the nose at approximately a right angle to the latitudinal axis of the handle;
   a nut runner, comprising:
      a body having a distal end and a proximate end;
      gear head coupled to the proximate end of the body, the gear head operable to rotate, thereby clamping the paddle fitting tool to the paddle fitting; and
   a saddle operable to couple the drill to the nut runner such that the drill is operable to drill a hole through the wing spar that is approximately concentric with the bottom fork hole and is approximately concentric the top fork hole, the saddle comprising:
      a lead screw operable to engage the gear head;
      an upper plate operable to couple the drill to the saddle;
      a clamp plate coupled to the top clamp, the clamp plate having a threaded cavity in which the lead screw travels during rotation of the gear head;
      an alignment clamp coupled to the clamp plate; and
      a locator pin coupled to the alignment clamp, the locator pin operable to engage in the bottom fork hole to position the paddle fitting tool prior to clamping the paddle fitting tool to the paddle fitting, the nut runner operable to rotate the gear head, thereby rotating the lead screw such that the alignment clamp contacts the bottom fork of the paddle fitting tool and the nose contacts the top fork to provide a clamping force on the paddle fitting, said rotation of the gear head continuing until the nut runner reaches a predetermined torque setting to bring the clamping force on the paddle fitting to a predetermined level.

9. The paddle fitting tool of claim 1, further comprising a handle clamp coupling the body of the nut runner to the handle of the drill to add stability to the paddle fitting tool during operation.

10. The paddle fitting tool of claim 6, wherein the saddle comprises:
   a clamp plate having a threaded cavity in which the lead screw travels during rotation of the gear head;
   an alignment clamp coupled to the clamp plate; and
   a locator pin coupled to the alignment clamp, the locator pin operable to engage in the bottom fork hole to position the paddle fitting tool prior to clamping the paddle fitting tool to the paddle fitting.

11. A method for drilling a hole through a wing spar inserted in a paddle fitting, the paddle fitting comprising a top fork having a top fork hole formed within the top fork and a bottom fork having a bottom fork hole formed within the bottom fork, the method comprising:
   coupling a nut runner to a drill using a saddle to form a paddle fitting tool, the coupling performed so as to properly align the drill and the wing spar;
   inserting the wing spar into the paddle fitting between the top fork and the bottom fork;
   engaging a pin locator of the nut runner with the bottom fork hole of the paddle fitting;
   operating the nut runner to rotate a gear head on the nut runner to clamp the paddle fitting tool to the paddle fitting;
   coupling a drill bit to the drill;
   operating the drill to rotate the drill bit of the drill at a speed sufficient to drill a hole in the wing spar;
   drilling a hole in the wing spar that is concentric with the top fork hole and the bottom fork hole;
   passing a bolt through the top fork hole, the hole in the wing spar, and the bottom fork hole;
   engaging a nut on a threaded end of the bolt; and
   tightening the nut to a predetermined torque against the paddle fitting.

12. The method of claim 11, wherein coupling the nut runner to the drill further comprises aligning a drill bit coupled to the drill vertically with a side centerline running through the top fork hole and the bottom fork hole and aligning the drill bit vertically with a front centerline running through the top fork hole and the bottom fork hole.

13. The method of claim 11, wherein drilling a hole in the wing spar further comprises drilling the wing spar hole using a drill bit having a diameter approximately equal to the diameter of the top fork hole and further having a diameter such that a bolt passed through the wing spar hole has an interference fit with the wing spar.

14. The method of claim 11, wherein coupling the nut runner to the drill with a saddle further comprises coupling the nut runner to the drill such that a nose of the drill aligns vertically with said pin locator of the nut runner along a side centerline and a front centerline.

15. The method of claim 11, wherein clamping the paddle fitting tool to the paddle fitting further comprises rotating a lead screw coupled to the gear head to bring a nose of the drill and an alignment clamp of the saddle in contact with the paddle fitting on opposing sides of the paddle fitting to provide a clamping force on the paddle fitting for holding the paddle fitting stationary during drilling.

16. The paddle fitting tool of claim 8, further comprising a drill bit coupled to the spindle and operable to form a hole in the wing spar.

17. The paddle fitting tool of claim 8, wherein the saddle further couples the nut runner to the drill such that the drill bit aligns vertically with a side centerline running vertically through both the top fork hole and the bottom fork hole and with a front centerline running vertically through both the top fork hole and the bottom fork hole.

18. The paddle fitting tool of claim 8, wherein the saddle couples the nut runner to the drill such that the nose aligns vertically with the locator pin along a side centerline and along a front centerline.

19. The paddle fitting tool of claim 8, further comprising, a drill bit coupled to the spindle and operable to form a hole in the wing spar, the drill bit having a diameter approximately equal to a diameter of the top fork hole.

\* \* \* \* \*